No. 608,162. Patented July 26, 1898.
C. M. SWISHER.
NUT LOCK.
(Application filed Nov. 8, 1897.)
(No Model.)
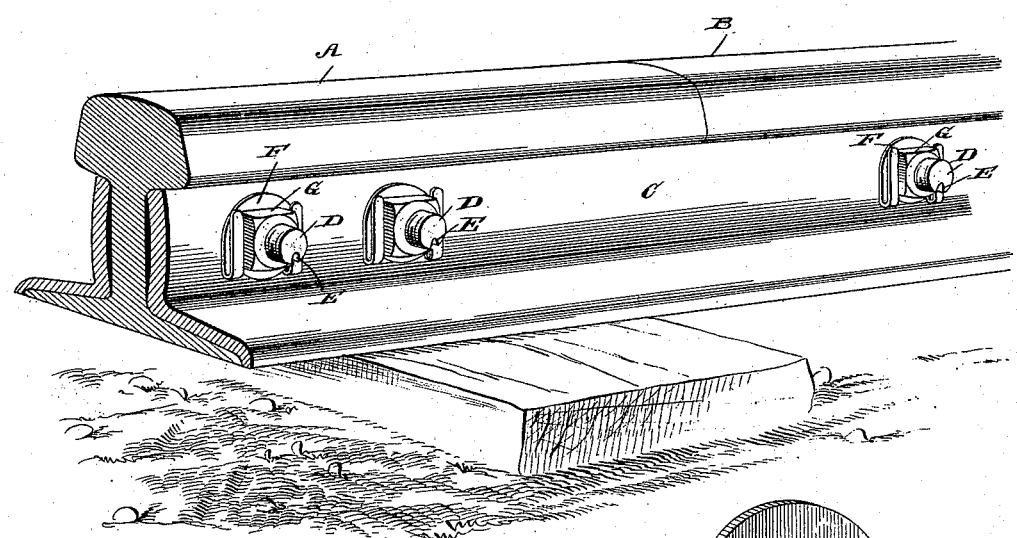
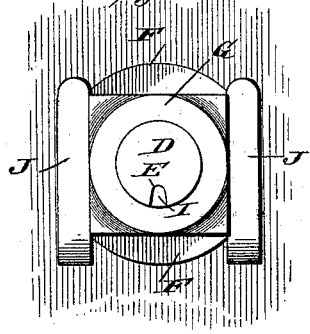
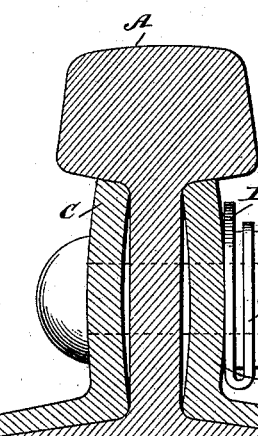
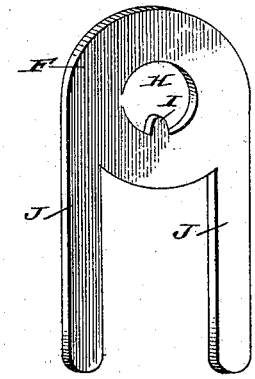
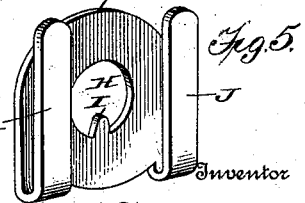
Witnesses
J. C. Shaw
Chas. E. Brock
Inventor
Chas. M. Swisher,
By O'Meara & Co.
Attorneys

United States Patent Office.

CHARLES M. SWISHER, OF MEDARYVILLE, INDIANA, ASSIGNOR TO SAMUEL N. GERBER, OF SAME PLACE.

NUT-LOCK.

SPECIFICATION forming part of Letters Patent No. 608,162, dated July 26, 1898.

Application filed November 8, 1897. Serial No. 657,861. (No model.)

*To all whom it may concern:*

Be it known that I, CHARLES M. SWISHER, residing at Medaryville, in the county of Pulaski and State of Indiana, have invented a new and useful Nut-Lock, of which the following is a specification.

This invention relates to improvements in nut-locks; and the object of the same is to provide a simple and effective lock for preventing the accidental displacement of the nut.

A further object is to provide a combined washer and nut-lock so constructed that it may be used in connection with any nut without requiring any alteration or change in the construction of the latter whatever, the device being easily applied and positive and reliable in operation.

With the above objects in view the invention consists in a washer having a key formed thereon, which engages a splineway formed in the bolt, so that the washer is prevented from turning, said washer being formed with tangential arms, which are adapted to be bent backward upon the washer and on each side of the nut, so as to prevent turning of the latter, the washer being sufficiently large in diameter to permit said bending of the locking-arms.

The invention further consists in the improved construction, arrangement, and combination of parts hereinafter fully described, and afterward specifically pointed out in the claim.

In order to enable others skilled in the art to which my invention most nearly appertains to make and use the same, I will now proceed to describe its construction and operation, having reference to the accompanying drawings, forming part of this specification, in which—

Figure 1 is a perspective view showing the practical application of my invention, the meeting ends of two railroad-rails and the fish-plate being shown. Fig. 2 is a vertical sectional view taken through the rail and-fish plate, showing my invention in side elevation. Fig. 3 is a front elevation of my invention in connection with the bolt and nut. Fig. 4 is a perspective view of my invention, the same being shown before the bending of the locking-arms to form the lock. Fig. 5 is a similar view showing the arms bent to form the nut-lock.

Like letters of reference mark the same parts wherever they occur in the various figures of the drawings.

Referring to the accompanying drawings, A and B designate the two rails, C the fish-plate, and D the bolts, each bolt being formed with a splineway E.

F is a washer which is larger in diameter than the nut G, so that when the washer and nut are in position upon the bolt the washer projects beyond the edges of the nut. The washer is circular in form, as illustrated, and provided with the bolt-opening H and the key or feather I, which engages the splineway of the bolt, so that said washer is prevented from turning. J are parallel arms projecting tangentially from the washer and of sufficient length to be bent backward upon said washer, as illustrated in Fig. 5.

In operation the washer is placed upon the bolt and then the nut adjusted properly, when the arms are bent backward upon the washer and extend on opposite edges of the nut, so that turning of the latter is prevented.

By having the washer of larger diameter than the nut the arms when bent backward engage the edges thereof, the space between the inner edges of said arms being sufficient to permit said arms to extend on opposite sides of the nut when bent to form the lock.

From the above description it will be seen that I have produced a simple construction of washer and nut-lock which may be quickly applied and which is positive and reliable in its action and cheap to manufacture.

While I have illustrated and described the best means now known to me for carrying out my invention, I do not wish to be understood as restricting myself to the exact details of construction shown and described, but hold that any slight changes or variations, such as might suggest themselves to the ordinary mechanic, will properly fall within the limit and scope of my invention.

Having thus fully described my invention, what I claim as new, and desire to secure by Letters Patent of the United States, is—

In a nut-lock, the combination with the bolt provided with a splineway and a nut, of a washer having a feather adapted to engage the splineway, and locking-arms extending tangentially from the washer and adapted to be bent backward thereon and extend on opposite edges of the nut to prevent turning of the latter, substantially as set forth.

CHARLES M. SWISHER.

Witnesses:
SAMUEL N. GERBER,
BYRON C. MCMURRAY.